US008953789B2

(12) United States Patent
Arnold et al.

(10) Patent No.: US 8,953,789 B2
(45) Date of Patent: Feb. 10, 2015

(54) COMBINING KEY CONTROL INFORMATION IN COMMON CRYPTOGRAPHIC ARCHITECTURE SERVICES

(75) Inventors: Todd W. Arnold, Charlotte, NC (US); Carsten D. Frehr, Farum (DK); Richard V. Kisley, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 710 days.

(21) Appl. No.: 13/150,448

(22) Filed: Jun. 1, 2011

(65) Prior Publication Data

US 2012/0308000 A1  Dec. 6, 2012

(51) Int. Cl.
*H04L 9/00* (2006.01)
(52) U.S. Cl.
USPC ............................................. 380/44; 380/277
(58) Field of Classification Search
USPC ..................................... 380/44, 277; 713/189
See application file for complete search history.

(56) References Cited

U.S. PATENT DOCUMENTS

| 4,918,728 | A | 4/1990 | Matyas et al. |
| 5,007,089 | A | 4/1991 | Matyas et al. |
| 5,200,999 | A | 4/1993 | Matyas et al. |
| 5,432,849 | A | 7/1995 | Johnson et al. |
| 2010/0031021 | A1* | 2/2010 | Arnold et al. ............. 713/155 |
| 2010/0158247 | A1* | 6/2010 | Hopkins et al. ............. 380/44 |

FOREIGN PATENT DOCUMENTS

| JP | 2005051360 A | 2/2005 |
| JP | 2008092432 A | 4/2008 |

OTHER PUBLICATIONS

International Business Machines Corporation "Addendum to CCA Basic Services Reference and Guide for the IBM 4765 PCIe and IBM 4764 PCI-X Cryptographic Coprocessors" Twenty Fourth Edition; Jul. 2012, (c) Copyright International Business Machines Corporation 2012; URL: http://www-03.ibm.com/security/cryptocards/pciecc/pdf/bs_latest_edition.pdf; 64 pages.
International Search Report and Written Opinion for International Application No. PCT/IB2012/052680; International Filing Date: May 29, 2012; 8 pages.
International Business Machines Corporation "Application Programmer's Guide" z/OS Cryptographic Services Integrated Cryptographic Service Facility, Fourteenth Edition, Nov. 2009, (c) Copyright International Business Machines Corporation, 1997, 2009; URL: http://publiz.boulder.ibm.com/epubs/pdf/csfb4za0.pdf; 788 pages.

* cited by examiner

*Primary Examiner* — Baotran N To
(74) *Attorney, Agent, or Firm* — Cantor Colburn LLP; Steven Chiu

(57) ABSTRACT

A system includes a processor configured to perform a method, the method comprising receiving a first key token, second key token and a request to combine the first key token with the second key token, identifying a key type of the first key token and a key type of the second key token, determining whether the key type of the first key token may be combined with the key type of the second key token, combining the first key token with the second key token to create a third key token responsive to determining that the key type of the first key token may be combined with the key type of the second key token, and outputting the third key token.

11 Claims, 5 Drawing Sheets

COMBINING KEY CONTROL INFORMATION IN COMMON CRYPTOGRAPHIC ARCHITECTURE SERVICES

BACKGROUND

The present invention relates to cryptographic keys, and more specifically, to cryptographic keys in the common cryptographic architecture (CCA) services.

The CCA is often used in financial services such as payment card services to protect financial data such as user account data and verification codes. The CCA specifies a byte array of key control information called a control vector (CV) that is bound to a cryptographic key such as a data encryption standard (DES) key that is secured using a physically secure hardware security module (HSM). The CV is used in both the management of the key and to control the key usage.

Bits in the CV represent, for example, a key type that identifies broad capabilities of the key such as whether the key may encipher and/or decipher data, wrap or unwrap keys, computing or verifying message authentication codes (MACs), encrypting or decrypting personal identification number (PIN) information, and generating or verifying PIN information. The CV bits may also represent a key sub-type that is a restriction on key capability within actions supported by the key type, such as limiting the key to be used for either encrypting or decrypting, but not both. The CV bits may include key management indicators that control whether the key may be distributed, and if so, whether the key is exportable when wrapped in a key block. The key usage may also be represented in the CV bits. Key usage controls how the key may be used beyond limits imposed by the key type and key sub-type, such as, for example, limits on the types of data that may be processed by the key or types of keys that may be wrapped with the key.

The CV is usually an 8 Byte or 16 Byte quantity matching the length of a DES key to which it is bound. The CV is usually included in a CCA data structure called a key token that also includes a wrapped version of the key. The wrapping process cryptographically binds the CV to the key such that changing the CV will alter the resultant value of the key when unwrapped, rendering the key useless.

SUMMARY

According to an embodiment of the present invention, a system includes a processor operative to receive a first key token, second key token and a request to combine the first key token with the second key token, identify a key type of the first key token and a key type of the second key token, determine whether the key type of the first key token may be combined with the key type of the second key token, combine the first key token with the second key token to create a third key token responsive to determining that the key type of the first key token may be combined with the key type of the second key token, and output the third key token.

According to another embodiment of the present invention, a non-transitory computer-readable storage medium including computer executable instructions that, when executed on a processor of a computer apparatus, direct the processor to perform a method for creating a key token, the method includes receiving a first key token, second key token and a request to combine the first key token with the second key token, identifying a key type of the first key token and a key type of the second key token, determining whether the key type of the first key token may be combined with the key type of the second key token, combining the first key token with the second key token to create a third key token responsive to determining that the key type of the first key token may be combined with the key type of the second key token, and outputting the third key token.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

An example of a common cryptographic architecture (CCA) service is called card verification value generate (CVV-generate) that uses two eight byte CCA keys to generate payment card verification values. Another CCA service is called CVV-verify, which uses either the original set of keys, or in some instances, a second set of keys that include control vector (CV) based restrictions that may be used only with the CVV-verify service to verify CVVs.

Each service uses two separate eight byte key tokens referred to as key_a and key_b. The cryptographic keys wrapped in the tokens are used for distinct purposes in the CVV-generate and CVV-verify services. The CCA service supports three types of keys that may be used for the key_a and key_b. The three types of keys include process specific keys that are used for CVV-verify and CVV-generate services the process specific keys are called CVV-KEYA and CVV-KEYB. Keys that may compute message authentication codes (MACs) as well as CVVs are called ANY-MAC keys. Keys that may compute MACs as well as encrypt and decrypt data as well as computing CVVs are called DATA keys.

Under previous CCA specifications, separate 8-byte keys were used for the key_a and the key_b. Under some CCA specifications, a single 16-byte key may be used for the processes, where the 16-byte key includes two halves each half cryptographically bound to the key token using a wrapping process implemented in a hardware security module (HSM).

The methods and systems described below allow users of schemes using the separate 8-byte keys to convert the separate 8-byte keys into a single 16-byte key while maintaining control information and security of the keys. For illustrative exemplary purposes the example keys include two 8-byte keys that are combined into a single 16-byte key however, the exemplary embodiments are not limited to particular key lengths. Thus, any arrangement of any number of shorter keys having any key length may be combined into a single larger key using methods and systems similar to the methods and systems described below.

Figure 1:
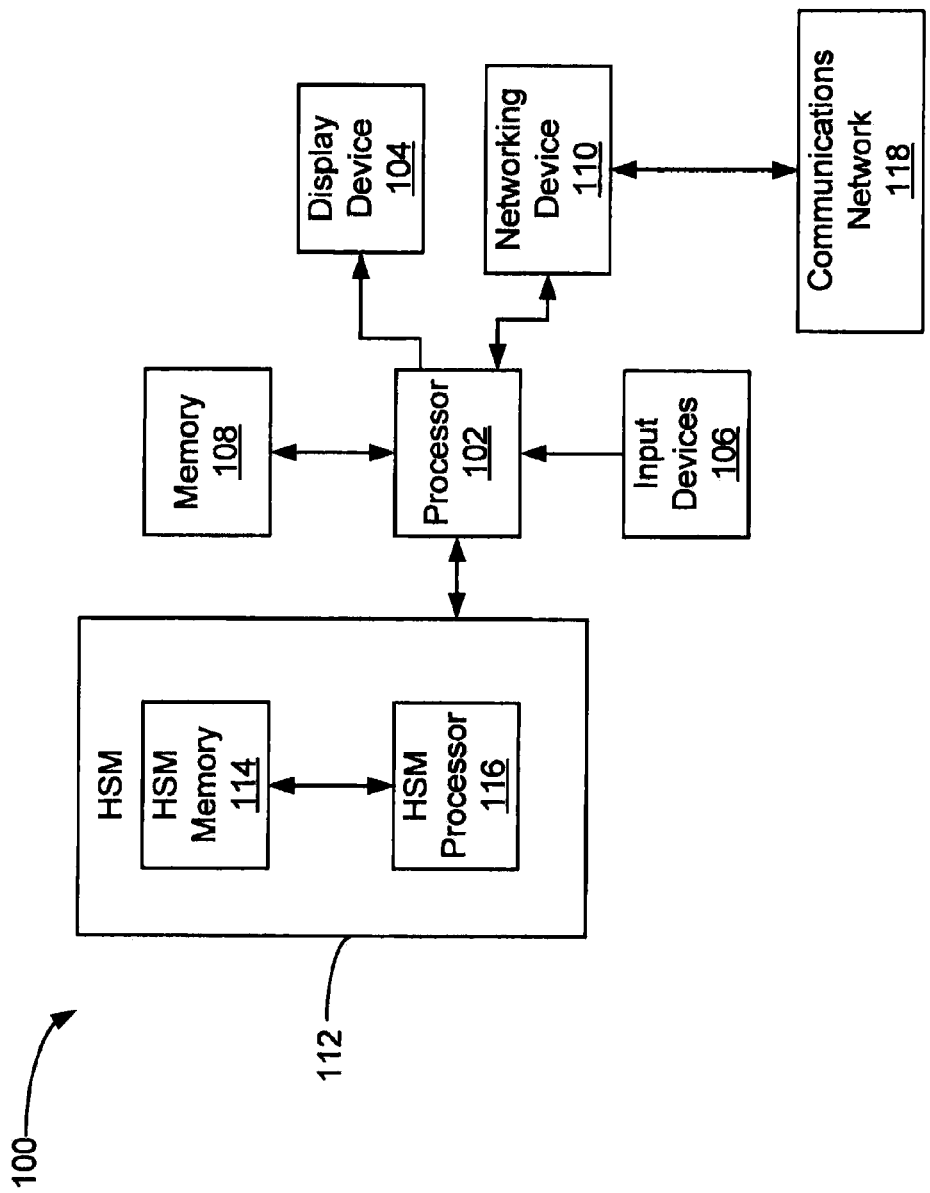
FIG. 1 illustrates an exemplary embodiment of a system.

In this regard, FIG. 1 illustrates an exemplary embodiment of a system 100. The system 100 includes a processor 102 that is communicatively connected to a display device 104, input devices 106, memory 108, a networking device 110, and a HSM 112. The networking device 110 may be communicatively connected to communications networks 118 that may be communicatively connected to other processors (not shown). The HSM 112 includes an HSM processor 116 that is communicatively connected to an HSM memory 114.

In operation, the processor 102 may operate, for example, application programming interfaces (APIs) that perform processing tasks and creates and sends data packets with call parameters to the HSM 112. The HSM processor 116 receives and processes the data packets and creates a response packet that is sent to the requesting API. A data packet may include for example, a set of parameters that are defined as pointers to objects. The parameters include, for example, key_a_identifier length that is a pointer to an integer specifying the length of the key_a_identifier parameter in bytes. The key_a_identifier is a pointer to a string variable containing the CCA key token containing the key. A key_b_identifier length and a key_b_identifier parameter are similar to the key_a parameters described above, but are associated with the key_b. An output_key_identifier length is a pointer to an integer specifying the length of the output_key_identifier parameter in bytes. The output_key_identifier parameter is a pointer to a string variable that receives the output key token carrying the 16-byte version of the 8-byte input key_a and 8-byte input key_b and the CV.

Figure 2A:
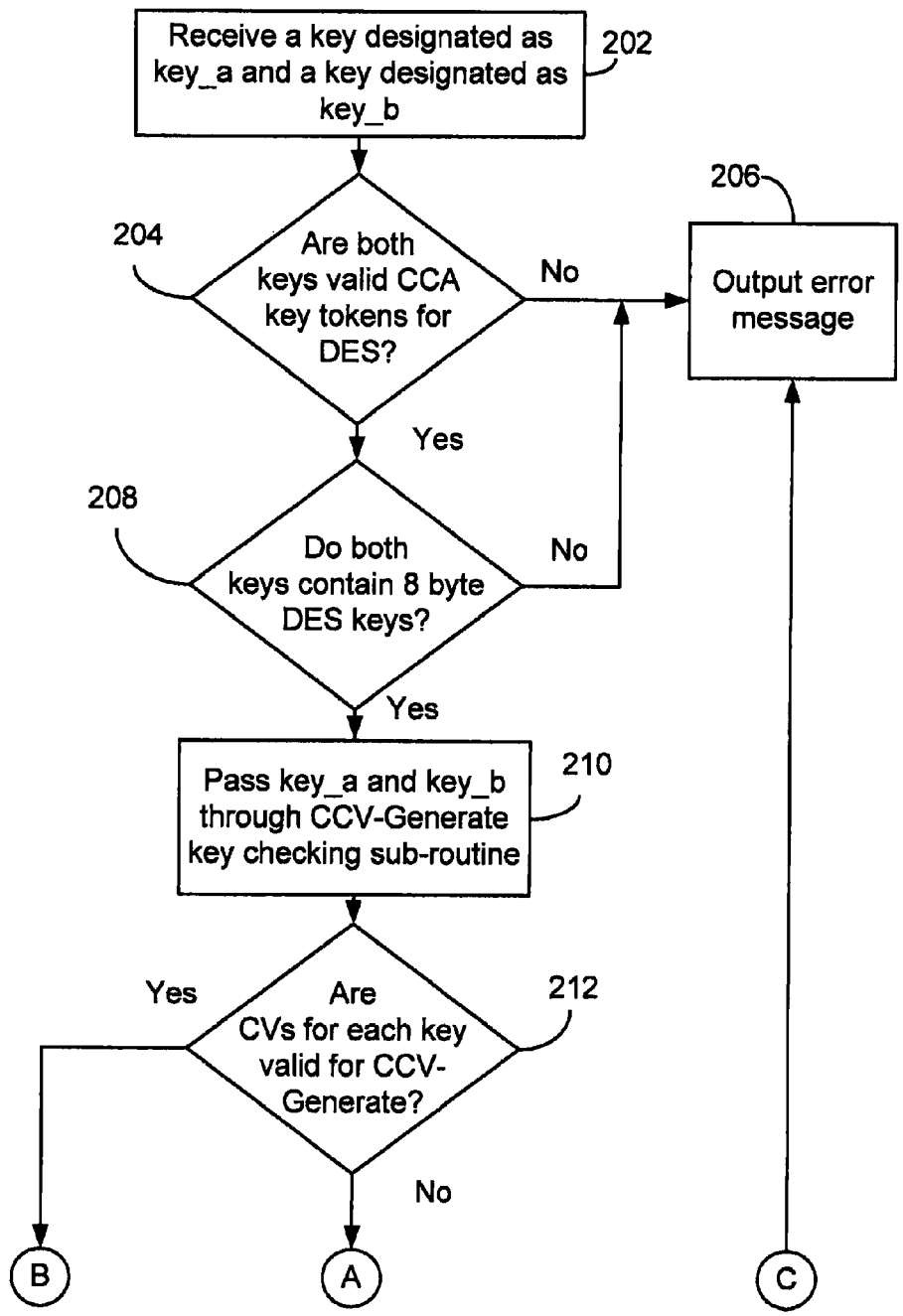
FIGS. 2A-2B illustrate a block diagram of an exemplary method that may be performed by the system of FIG. 1.
Figure 2B:
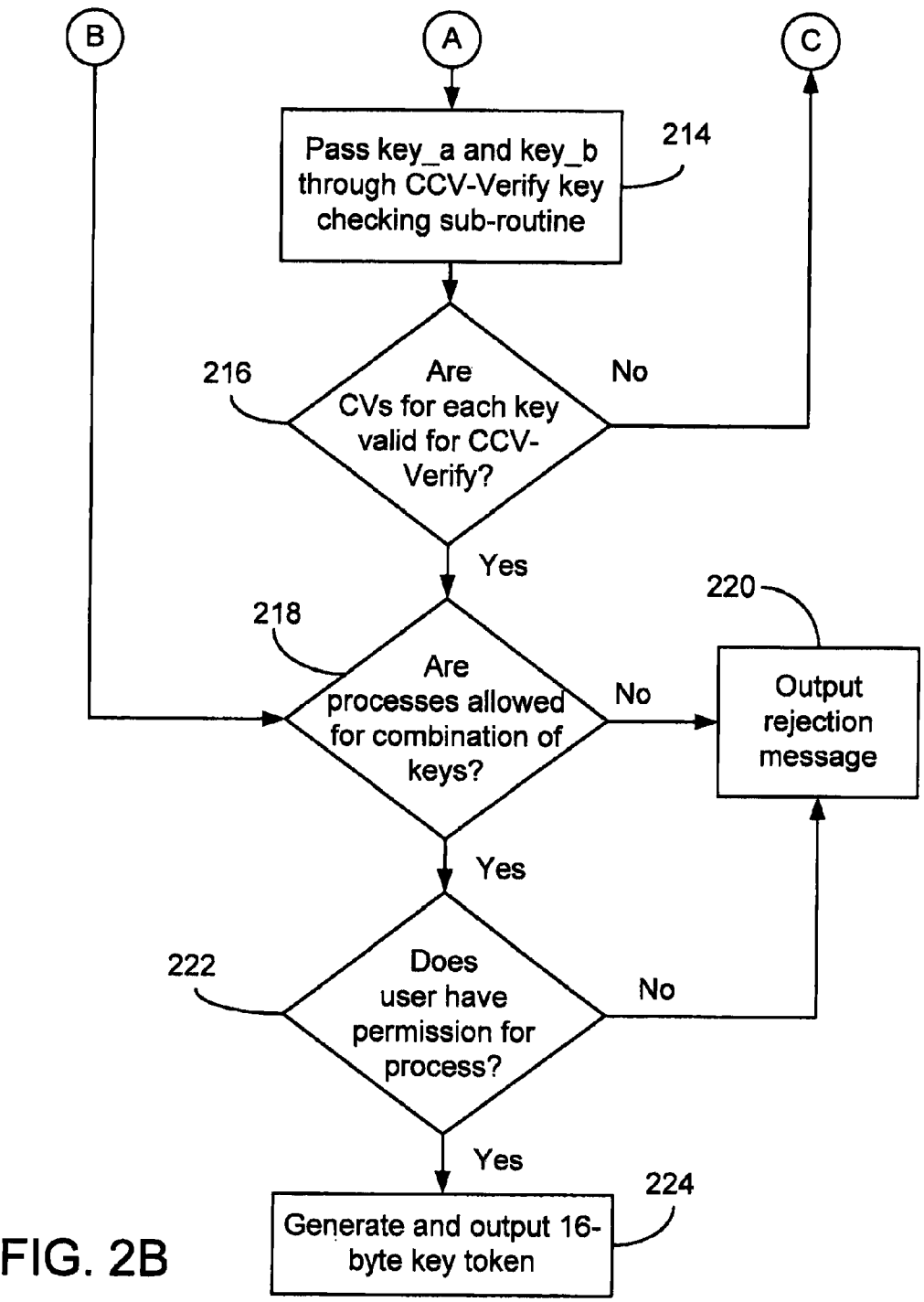

FIGS. 2A-2B illustrate a block diagram of an exemplary method that may be performed by the system 100 (of FIG. 1). Referring to FIG. 2A, in block 202, the HSM 112 receives a key designated as key_a and a key designated as key_b. The keys may be received from, for example, the memory 108 via the processor 102. In block 204, the HSM 112 determines if both of the received keys are valid CCA key tokens for the symmetric encryption algorithm used in the scheme, such as, for example, data encryption standard (DES). In this regard, the HSM 112, for example, verifies the integrity of the CCA key tokens to ensure that the CCA key tokens have not been corrupted, verifies that all fields contain valid values, verifies that the token type identifier is for an acceptable DES token, and other validity checks. If both of the keys are not valid CCA key tokens for DES, an error message may be output to the user in block 206. If both of the keys are valid CCA tokens for DES, the HSM 112 determines whether both of the keys contain 8-byte DES keys in block 208. If no, an error message may be output in block 206. In block 210, the designated key_a and key_b are passed through a CVV-generate key checking sub-routine. The CVV-generate key checking sub-routine determines whether both of the CVs for the designated key_a and key_b are valid for a CVV-generate service in block 212. If both of the CVs are not valid for the CVV-generate service, in block 214 (of FIG. 2B) the designated key_a and key_b are passed through a CVV-verify key checking sub-routine. The CVV-verify key checking sub-routine determines whether both of the CVs for the designated key_a and key_b are valid for a CVV-verify service in block 216. If the both CVs are not valid for the CVV-verify, an error message may be output in block 206 (of FIG. 2A). If both of the CVs are valid for at least one of the CVV-generate or CVV-verify services, in block 218 the HSM 112 determines whether the combination process is allowed for the combination of the particular types of keys that are designated as key_a and key_b. Though the illustrated embodiments include the use of DES, any other particular symmetric encryption algorithm or scheme may also be used in alternate embodiments.

Figure 3:
FIG. 3 illustrates a table that is used by the system of FIG. 1.

In this regard, FIG. 3 illustrates a table 300 that is used by the HSM 112 to logically determine whether the combination process is allowed based on the particular types of keys that are designated as key_a and key_b. Referring to FIG. 3, the HSM 112 determines what type of key is designated as key_a and what type of key is designated as key_b and applies the table 300 to determine whether the combination process is allowed or not allowed. For example, if the 8-byte input key designated as key_a is a CVVKEY-A type key, and the 8-byte input key designated as key_b is a CVVKEY-B type key, the combination process to combine the keys into a 16-byte key is allowed. If the 8-byte input key designated as key_a is a DATA type key, and the 8-byte input key designated as key_b is a DATA type key, the combination process to combine the keys into a 16-byte key is allowed. Similarly, if the 8-byte input key designated as key_a is an ANY-MAC type key, and the 8-byte input key designated as key_b is an ANY-MAC type key, the combination process to combine the keys into a 16-byte key is allowed. Alternatively, if the if the 8-byte input key designated as key_a is a CVVKEY-B type key the combination process is not allowed regardless of the type of key designated as key_b, while if the 8-byte input key designated as key_b is a CVVKEY-A type key the combination process is not allowed regardless of the type of key designated as key_a.

Referring back to FIG. 2B, if the combination process is not allowed for the combination of the particular types of keys that are designated as key_a and key_b, a rejection message may be output in block 220. In block 222 the HSM 112 determines whether the user has the necessary permissions to direct the system 100 to perform the combination process. For the combinations of keys designated as allowed in the table 300 (of FIG. 3) most or all users may be allowed to direct the system 100 to perform the combination process. Other combination of key types may be allowed if the user has the necessary security permissions to direct the system 100 to perform the combination of the particular key types. The security permissions of the user may be determined using, for example, a user login procedure that identifies the user and indicates a security level for the user. For example, referring to FIG. 3, if the if the 8-byte input key designated as key_a is a CVVKEY-A type key, and the 8-byte input key designated as key_b is either a DATA type key or an ANY_MAC type key, the combination process to combine the keys into a 16-byte key is allowed conditionally as long as the user requesting the combination process is authorized or has the necessary permissions to direct the system 100 to perform such a combination process. Referring to FIG. 2B, if the user does not have the necessary permissions to direct the system 100 to perform the combination process for the particular keys (as indicated in the table 300), a rejection message may be output in the block 220. If the user does have the necessary permissions to perform the combination process for the particular keys (as indicated in table 300), the HSM 112 creates a 16-byte key token using the received 8-byte key tokens and outputs the created 16-byte key token to the user, which may be output, for example, via the display device 104 (of FIG. 1), or saved in the memory 108 for later retrieval by a user.

Figure 4:
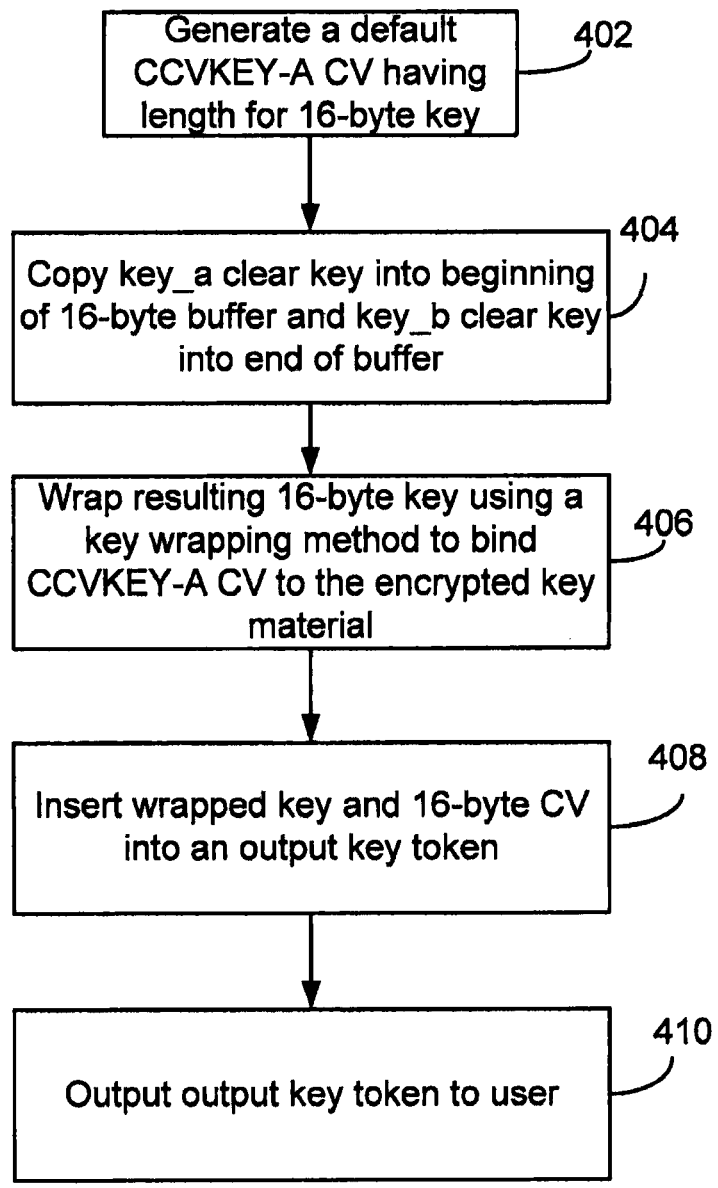
FIG. 4 illustrates a block diagram of an exemplary method for creating a key token that may be performed by the system of FIG. 1.

FIG. 4 illustrates a block diagram of an exemplary method for creating a 16-byte key token. In block 402, a default CVVKEY-A CV is generated having a length for a 16-byte key. In this regard, the CVVKEY-A is a key token structure containing default values for a token that will hold a 16-byte CVV key. The CVVKEY-A has space reserved for the keys, contains the CV, and other control information such as, for example, a token identifier flag, a token version number, flag bytes, and a token validation value. The unencrypted 8-byte key designated as key_a is copied into the beginning of a 16-byte buffer, and the unencrypted key designated as key_b is copied into the end of the 16-byte buffer in block 404. In block 406, the resultant 16-byte key in the buffer is wrapped using a key wrapping method that encrypts the key material and binds the CVVKEY-A CV to the encrypted key material. Any appropriate wrapping method may be used for the particular token type. The wrapping process ensures that the CV cannot be altered without rendering the key material unusable. The wrapped key and the 16-byte CVVKEY-A CV are inserted into an output key token in block 408. In block 410, the output key token is output to the user.

An example key wrapping process is described below however; any appropriate alternative key wrapping process may be used in alternate embodiments. In this regard, for a 16-byte DES key (K), where the left 8 bytes are KL and the right 8 bytes are KR, a double-length DES key-encrypting key KEK, having two halves KEKL and KEKR will be used to wrap the key K along with a control vector CV having two halves CVL and CVR. The process includes computing KEKL'=KEKL XOR CVL (where XOR is an exclusive-OR logical operation) and KEKR'=KEKR XOR CVR. The values KEKL' and KEKR' are used together as a double-length DES key KEK'. The KL is encrypted with KEK' using triple-DES electronic code book (ECB) encryption to define the left half of the wrapped key, and the KR is encrypted with KEK' using triple DES ECB encryption to define the right half of the wrapped key. The key token structure described above receives the CV, the left and write halves of the wrapped key and other elements that are part of the token structure.

The technical effects and benefits of the above described embodiments allow a set of short keys to be combined into a longer key that may be output to a user without compromising the security of the keys or the system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
a memory having computer readable instructions; and
a hardware security module processor configured to execute the computer readable instructions, the computer readable instructions comprising:
receiving a first key token, second key token and a request to combine the first key token with the second key token;
determining whether the first key token and the second key token are valid common cryptographic architecture (CCA) tokens for a particular encryption algorithm;
determining whether the first key token and the second key token contain keys of the particular encryption algorithm, the particular encryption algorithm keys having a desired number of bytes;
identifying a key type of the first key token and a key type of the second key token based on determining that the first key token and the second key token are valid CCA tokens for the particular encryption algorithm and that the first key token and the second key token contain the particular encryption algorithm keys having the desired number of bytes;
determining whether the key type of the first key token is configured to be combined with the key type of the second key token;
combining the first key token with the second key token to create a third key token responsive to determining that the key type of the first key token is configured to be combined with the key type of the second key token; and
outputting the third key token.

2. The system of claim 1, wherein the computer readable instructions further comprise:
determining, prior to combining the first key token with the second key token to create the third key token, whether a user requesting to combine the first key token with the second key token is authorized to request the combination based on the key type of the first key token and the key type of the second key token; and
denying the request to combine the first key token with the second key token responsive to determining that the user is not authorized to request the combination based on the key type of the first key token and the key type of the second key token.

3. The system of claim 1, wherein the computer readable instructions further comprise:
determining, prior to identifying the key type of the first key token and the key type of the second key token, whether a first control vector associated with the first key token and a second control vector associated with the second key token are each valid for a card verification value-generate service;
based on determining that the first control vector and the second control vector are not valid for the card verification value-generate service, determining whether the first control vector and the second control vector are valid for a card verification value-validate service; and
outputting an error message responsive to determining that the first control vector and the second control vector are not valid for the card verification value-validate service.

4. The system of claim 1, wherein the combining the first key token with the second key token to create the third key token comprises:
generating a control vector;
copying a key of the first key token into a first portion of a buffer;
copying a key of the second key token into a second portion of the buffer;
wrapping the keys in the buffer to bind the control vector to the keys; and
inserting the wrapped keys and the control vector into an output key token to define the third key token.

5. The system of claim 1, wherein the first key token is an 8-byte token, the second key token is an 8-byte token and the third key token is a 16-byte token.

6. A computer program product comprising:
a non-transitory computer-readable storage medium including computer executable instructions that, when executed on a processor, direct the processor to perform a method for creating a key token, the method comprising:
receiving a first key token, second key token and a request to combine the first key token with the second key token;
determining whether the first key token and the second key token are valid common cryptographic architecture (CCA) tokens for a particular encryption algorithm;
determining whether the first key token and the second key token contain keys of the particular encryption algorithm, the particular encryption algorithm keys having a desired number of bytes;
identifying a key type of the first key token and a key type of the second key token based on determining that the first key token and the second key token are valid CCA tokens for the particular encryption algorithm and that the first key token and the second key token contain the particular encryption algorithm keys having the desired number of bytes;
determining whether the key type of the first key token is configured to be combined with the key type of the second key token;
combining the first key token with the second key token to create a third key token responsive to determining that the key type of the first key token is configured to be combined with the key type of the second key token; and
outputting the third key token.

7. The computer program product of claim 6, wherein the method further comprises:
determining, prior to combining the first key token with the second key token to create the third key token, whether a user requesting to combine the first key token with the second key token is authorized to request the combination based on the key type of the first key token and the key type of the second key token; and
denying the request to combine the first key token with the second key token responsive to determining that the user is not authorized to request the combination based on the key type of the first key token and the key type of the second key token.

8. The computer program product of claim 6, wherein the method further comprises:
determining, prior to identifying the key type of the first key token and the key type of the second key token, whether a first control vector associated with the first key token and a second control vector associated with the second key token are each valid for a card verification value Generate service, responsive to determining that the first control vector and the second control vector are not valid for the card verification value Generate service, determining whether the first control vector and the second control vector are valid for a card verification value Validate service; and
outputting an error message responsive to determining that the first control vector and the second control vector are not valid for the card verification value Validate service.

9. The computer program product of claim 6, wherein the combining the first key token with the second key token to create the third key token comprises:
generating a control vector;
copying a key of the first key token into a first portion of a buffer;
copying a key of the second key token into a second portion of the buffer;
wrapping the keys in the buffer to bind the control vector to the keys; and
inserting the wrapped keys and the control vector into an output key token to define the third key token.

10. The computer program product of claim 6, wherein the first key token is an 8-byte token, the second key token is an 8-byte token and the third key token is a 16-byte token.

11. The computer program product of claim 6, wherein the processor is disposed in a hardware security module.

\* \* \* \* \*